Feb. 12, 1963  H. H. BLAU, JR., ET AL  3,077,539
RADIATION REFERENCE STANDARD
Filed Aug. 28, 1961

Henry H. Blau, Jr.
Richard S. Davis
INVENTORS

BY *[signature]*
Attorney

United States Patent Office 3,077,539
Patented Feb. 12, 1963

3,077,539
RADIATION REFERENCE STANDARD
Henry H. Blau, Jr., Weston, and Richard S. Davis, Lexington, Mass., assignors to Arthur D. Little, Inc., Cambridge, Mass., a corporation of Massachusetts
Filed Aug. 28, 1961, Ser. No. 134,500
8 Claims. (Cl. 250—85)

This invention relates to a reference standard for use with apparatus which are designed to measure radiant energy.

In many laboratory applications it is desirable to have a radiation source that is constant and reproducible. The particular characteristics of the source depend upon the application. For primary calibration of a pyrometer or radiometer, it is necessary to know the source temperature and emittance; or, in other words, the power radiated per unit area per unit solid angle. In other cases it is only necessary to determine the relative response of a radiation sensing instrument. This can be accomplished with a source of unknown temperature and emittance provided only that temperature and emittance are reproducible and unchanging. The apparatus of this invention furnishes a constant and reproducible radiant energy source for determining relative response of a sensing instrument.

It has been customary in the past to use black-body standards which are raised to and maintained at a controlled temperature. This is done by using uniformly heated enclosures such as is done in a so-called Hohlraum black body. The use of such heated enclosures, however, introduces difficulty in maintaining the required stable temperatures. Flames and heated plates have also been used as standards; but these also require stabilization, which in turn require careful control of heating.

It would be desirable in using apparatus designed to measure radiant energy to have available a simple, reliable, and inexpensive reference standard which could be periodically returned to a predetermined temperature and which offered a relatively large, uniformly emitting area.

It is therefore a primary object of this invention to provide a radiation reference standard which is reliable and which is not affected by ambient conditions. It is another object of this invention to provide apparatus of the character described which does not require stabilization or complicated controls. Yet another object is to provide a radiation reference standard which has a relatively large, uniformly emitting area and which, moreover, can be constructed for a relatively low cost. These and other objects will become apparent in the following detailed description of this invention.

The radiation standard of this invention may be broadly described as being comprised of a solid body adapted to be periodically heated above a transition point and formed of a material which, during cooling to a temperature below the transition point, exhibits a characteristic cooling curve having a plateau corresponding to a predetermined reproducible temperature, means for periodically heating the body above its transision temperature, radiant energy emitting means associated with and in heat exchange contact with the body and adapted to be heated by said body thereby to emit radiant energy at a reproducible energy level.

The apparatus of this invention may be further described with reference to the accompanying drawings in which.

Figure 2:
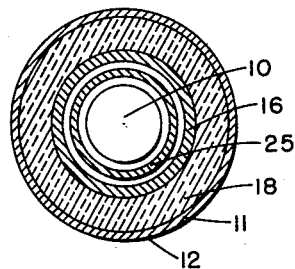
FIG. 2 is a cross-sectional view along lines 2—2 of FIG. 1.
Figure 1:
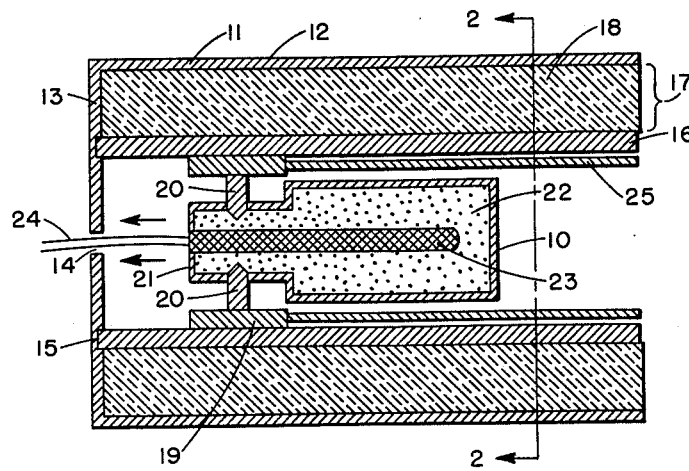
FIG. 1 is a lengthwise, cross-sectional view of a radiation reference standard constructed in accordance with this invention.

In FIGS. 1 and 2, it will be seen that the radiation reference standard of this invention comprises an emitting surface 10 mounted in a housing 12 which is conveniently formed from an outer aluminum tubing 11 which is closed at one end by joining thereto an end plate 13 which has a central opening 14 and an annular groove 15 which permits a smaller, concentric inner tubing 16 to be located and permanently affixed therein. This tubing 16 is preferably formed of a ceramic material, but this is not necessary. The two concentric tubings 11 and 16 serve as outer and inner walls respectively of the housing, and they define between them an annular space 17 which is filled with a suitable insulation 18 such as pearlite, a granular ceramic material, glass wool, and the like.

Within the housing is an annular support ring 19 attached to the inner wall 16. This annular support ring has supporting struts 20 extending from it in toward the central area of the device, and they are in turn affixed to a thin-walled cylindrical housing 21 in such a way that the cylindrical housing is held firmly in place while at the same time the heat leak through the supporting structure is maintained at a minimum. Within the cylindrical housing is placed the material 22, which is capable of passing through the required phase transition; and inserted into this material 22 is a heater 23 which is conveniently an electrical resistance heater connected to an electrical source (not shown) by connecting wires 24.

Within the central area, spaced away from the inner wall 16 and surrounding the cylindrical housing 21, is a ring-shaped radiation shield 25. This radiation shield 25 is constructed of a material which exhibits low emissivity; for example, a shiny aluminum or the like. It is preferable that this radiation shield, as well as the inner and outer walls 16 and 11, along with the insulation 18 therebetween, extend beyond the cylindrical housing 21 and hence beyond the emitting surface 10.

With the arrangement illustrated in FIG. 1, the heat leak outwardly is minimized. For all practical purposes, in this device the major portion of heat leaked or transferred out of the system is in the direction of the arrows shown. It will be appreciated that this arrangement provides for the ready stabilization of thermal conditions in the emitting surface end of the device. This, in turn, means that the device possesses good reliability.

By means of heater 23, the body of material 22 can be heated to a temperature above its transition point. If heater 23 is shut off, the body 22 begins to cool and in doing so exhibits a characteristic cooling curve. The thin-walled cylindrical housing 21 surrounding body 22 is in heat-transfer contact with it, and the cylindrical housing 21 and emitting surface 10 are raised to a temperature substantially equivalent to the temperature of the body 22. Because in cooling the body 22 exhibits a characteristic cooling curve which includes a plateau at a predetermined temperature, the emitting surface 10 is also maintained at that temperature for a period of time. This means that the temperature of the emitting surface 10 remains at a constant level over a period of cooling. The emitting surface 10 is therefore capable of forming a constant reliable level of radiant energy as a standard.

FIGS. 1 and 2 illustrate an apparatus having a circular cross section. It is within the scope of this invention to construct the apparatus with any suitable cross-sectional configuration including rectangular, triangular, or other polygonal forms.

The body 22 is constructed of a material which exhibits a phase transition and which upon cooling has a plateau in its cooling curve which extends over a sufficient period of time to permit the emitting surface 10 to come to equilibrium. The phase transition which takes place is associated with the liquefaction and solidification of the material making up the body and the plateau, or flat portion of the curve, results from the latent heat associated with the phrase transition taking place in the cooling. The length of the plateau depends upon the heat loss, the magnitude of the latent heat, and the volume of the body. It is desirable that this plateau be exhibited for a matter of several minutes in order that the emitting surface may come to equilibrium and emit a constant level of radiant energy for a sufficient length of time to permit measurements to be made.

Figure 3:
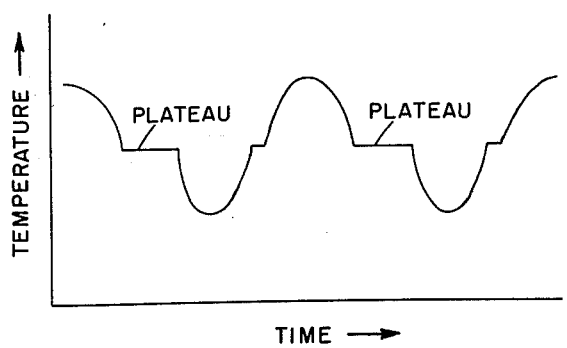
FIG. 3 is a plot showing a cooling curve for a typical eutectic material suitable for incorporation in the apparatus of this invetnion.

FIG. 3 illustrates a typical cooling curve for a germanium-silver eutectic mixture. By heating the eutectic to about 675° C., the point on the curve of FIG. 3 was reached as illustrated by the beginning of that curve. The heat source was then removed and the eutectic began to cool following the curve to the broad plateau region. Once the plateau was passed, cooling continued. When it was desired to use the radiant energy standard again, the heater was turned on and the body of material heated to a temperature above that at which the plateau occurred.

The temperature at which the plateau occurs is inherent in the material used and is substantially completely reproducible. For example, in the case of the germanium-silver eutectic, the temperature could be reproduced within ±2° C. It will be appreciated that the temperature of the emitting surface may not be exactly equal to the temperature at which the plateau occurs because of the gradient established in the emitting surface which is the end of the cylindrical housing. However, because of the length of the plateau, the emitting surface will come to equilibrium and will therefore be a source of reproducible radiant energy.

In like manner, various other materials which exhibit the necessary plateau in their cooling curves may be used. By proper choice of the material forming the regulating body of the apparatus, it is possible to provide a wide range of radiant energy levels and hence a wide range of reference standards as far as temperature goes. These materials may be metals, eutectics or salts. Among the metals which may be used are sodium, potassium, silver, gold, and platinum; while the eutectics which may be used include germanium-silver, lead-tin, silicon-silver, and gold-germanium. Pure salts such as the nitrates and chlorides of sodium, potassium and barium, or mixtures of these are also suitable. The choice of material will depend upon the temperature desired as a standard, and the degree of corrosiveness which can be tolerated.

The closely fitting cylindrical housing 21 (FIG. 2) should be constructed of a material which exhibits a high heat conductivity over the temperature range employed, and should preferably be as thin walled as possible while still providing the required structural strength to contain the material and heating means. It should also, of course, be resistant to corrosion by the material exhibiting the desired type of cooling curve. As an example, stainless steel has been found to be satisfactory for temperatures in the range of about 600° C. The emitting surface 10, along with the remaining surface of the cylindrical housing, if desired, may be treated to give it improved emission characteristics. As an example, stainless steel may be oxidized to impart to it the characteristics associated with a black body or gray body.

As shown in FIG. 1, insulation is required around the body of material 22 serving as a source of regulated thermal energy. Any suitable insulation which prevents thermal gradients in the body of material and which minimizes heat transfer outwardly can, of course, be used in place of the combination of concentric aluminum tubing and ceramic tubing with insulating material in between. For example, an evacuated insulation system (similar to a Dewar-type vessel) could be used. The arrangement of FIG. 1 has the advantage of being easy and inexpensive to construct.

The radiation shield spaced apart from the inner wall 16 of the insulation has been found to contribute appreciably to the minimizing of heat transfer. As noted above, both the insulation and radiation shielding preferably extend beyond the cylindrical housing containing the body of material to be heated.

The radiation reference standard of this invention is reliable; and as can be seen from its construction is not subject to fluctuations in ambient temperature. Moreover, it does not require any additional control or stabilization apparatus. Finally, the radiation reference standard of this invention is durable, easy to construct and offers a large area of emitting surface for use in radiant energy measuring apparatus.

It will be appreciated that many modifications in the construction and in the materials used may be made and these are within the scope of this invention.

We claim:

1. Radiation standard capable of emitting a closely reproducible level of radiant energy, comprising a body of material adapted to be periodically heated above a point at which a phase transition takes place, said material being one which, during cooling to a temperature below said point, exhibits a characteristic cooling curve having a plateau corresponding to a predetermined reproducible temperature; means for periodically heating said body above its transition point; radiant energy emitting means associated with and in heat exchange contact with said body and adapted to be heated by said body thereby to emit radiant energy at a reproducible level; insulation means surrounding said radiant energy emitting means thereby minimizing heat transfer outwardly from said body to the atmosphere.

2. Radiation standard in accordance with claim 1 wherein said material is a eutectic.

3. Radiation standard in accordance with claim 2 wherein said eutectic is germanium-silver.

4. Radiation standard in accordance with claim 1 wherein said material is a metal.

5. Radiation standard in accordance with claim 1 wherein said material is a salt.

6. Radiation standard capable of emitting a closely reproducible level of radiant energy, comprising a body of material adapted to be periodically heated above a transition point and being one which, during cooling to a temperature below said transition point, exhibits a characteristic cooling curve having a plateau corresponding to a predetermined reproducible temperature; means for periodically heating said body above its transition point; a thin-walled, cylindrical housing surrounding said body and in heat exchange contact therewith, one end of said cylindrical housing being adapted to emit radiant energy over substantially its entire area; radiation shielding surrounding said cylindrical housing, and insulation surrounding said radiation shielding and spaced therefrom, said radiation shielding and said insulation extending beyond said cylindrical housing thereby to thermally protect said one end emitting radiant energy.

7. Radiation standard in accordance with claim 6 wherein said cylindrical housing is formed of stainless steel, at least said one end adapted to emit radiant energy being oxidized.

8. Radiation standard in accordance with claim 6 wherein said insulation comprises an inner ceramic wall and an outer aluminum wall spaced apart and defining therebetween a space adapted to contain a finely divided insulating material.

References Cited in the file of this patent

UNITED STATES PATENTS

| | | |
|---|---|---|
| 2,534,257 | Flournoy | Dec. 19, 1950 |
| 2,808,494 | Telkes | Oct. 1, 1957 |
| 2,933,317 | Pittinger et al. | Apr. 19, 1960 |
| 2,952,762 | Williams et al. | Sept. 13, 1960 |
| 2,972,053 | Anderson | Feb. 14, 1961 |